C. A. DUNHAM.
RADIATOR TRAP.
APPLICATION FILED OCT. 10, 1913.
1,128,425.
Patented Feb. 16, 1915.
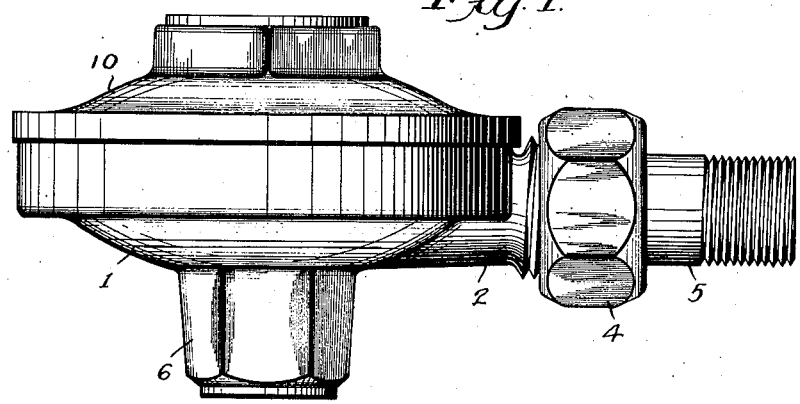
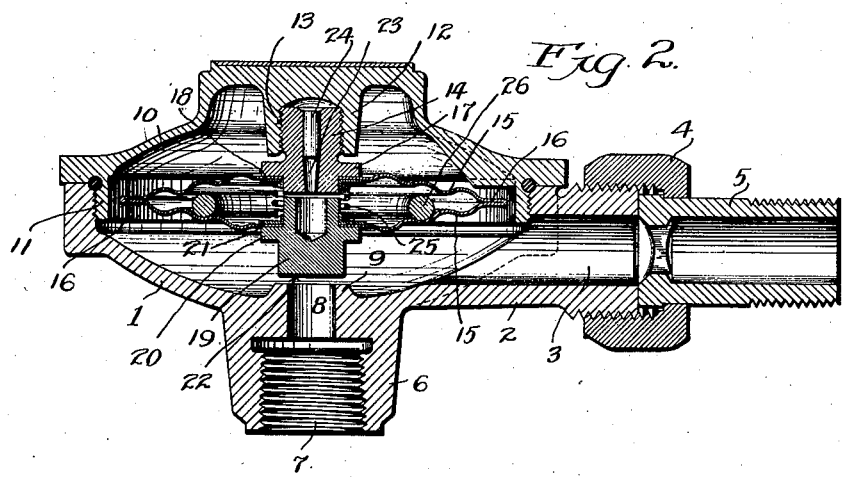
WITNESSES
INVENTOR
Clayton Rubra Dunham.
BY
ATTORNEY.

UNITED STATES PATENT OFFICE.

CLAYTON AUBRA DUNHAM, OF MARSHALLTOWN, IOWA.

RADIATOR-TRAP.

1,128,425. Specification of Letters Patent. Patented Feb. 16, 1915.

Application filed October 10, 1913. Serial No. 794,529.

*To all whom it may concern:*

Be it known that I, CLAYTON AUBRA DUNHAM, a citizen of the United States, residing at Marshalltown, in the county of Marshall and State of Iowa, have invented certain new and useful Improvements in Radiator-Traps, of which the following is a specification.

My invention relates to traps designed to be used primarily in connection with radiators of steam heating systems, and particularly steam heating systems wherein a partial vacuum is maintained in the return pipe, and known and designated in the trade as vacuum systems and vacuo-vapor systems.

Traps embodying my invention are provided with a valve that is controlled by a thermostatic device consisting of a closed, chambered, expansible member within which liquids are maintained adapted to be vaporized when the expansible member becomes heated, and to become condensed when the temperature of said member is reduced. The expansible member is inclosed within an outer casing, and when steam passes into the interior of said casing and comes in contact with the expansible member the liquids within said member become vaporized and the force of the vapors causes said member to expand and press the valve connected therewith down on to its seat, so as to prevent the outward passage of the steam from the interior of the outer casing through the valve opening.

Conversely, when the water of condensation accumulates within the interior of the outer casing, and thereby reduces the temperature of the expansible member, the vapors within said member condense, the pressure on the interior walls of the expansible member is thereby reduced, and said member contracts and lifts the valve from its seat, so as to permit air and the water of condensation within the outer casing to flow out of the trap through the valve opening. To aid in the operation of the expansible member a partial vacuum is maintained therein so as to produce a normal tendency on the part of the expansible member to contract and thereby keep the valve off the seat and permit air and the water of condensation to pass through the trap when there is an absence of steam within the outer casing.

In a heating system, traps embodying my invention are attached to the discharge end of radiators and the discharge end of the radiators is connected to a return pipe preferably having a partial vacuum maintained therein. The opposite or inlet end of the radiators is connected with a supply pipe.

If the expansible member of a trap embodying my invention, when attached to a radiator, becomes impaired to such an extent as to lose its partial vacuum, and the whole or part of the volatile liquids contained in said member, the member will not expand when steam enters the trap and the valve will remain raised off its seat. The steam from the supply pipe following the path of least resistance, will consequently continue to flow through the radiator to which said trap is connected and out into the return pipe, thereby destroying the partial vacuum in the return pipe and preventing the steam from the supply pipe rising and passing into the radiators on the floors above the defective trap.

My invention has for its object to provide means whereby a trap of the character herein described will automatically when impaired to the extent hereinbefore stated, close the valve down on to or near its seat, and thereby prevent or restrict the steam from passing through the radiator to which said impaired trap is attached and out into the return pipe, and at the same time place the radiator having the defective trap out of service, without interfering with the proper service of the other traps in the system. The fact that one of the traps of a steam heating system has become impaired, may then be readily learned from the absence of heat in the radiator to which said trap it attached.

It sometimes happens that the constant pulsation of the walls of an expansible member of a trap of the character herein described while acted upon by variations of temperature, will set up a buzzing sound, and my invention has for its further object to provide means for overcoming any monotonous audible vibration of the walls of the expansible member.

The foregoing objects of my invention and others hereinafter stated I accomplish by the means and in the manner hereinafter described, and illustrated, in the accompanying drawings in which similar characters of reference indicate similar parts throughout the several views, and in which—

Figure 1 is an elevation of a steam trap embodying my invention, and Fig. 2 is a vertical transverse section taken on the axial line of the device shown in Fig. 1.

As illustrated in the drawings, 1 represents the base section of the outer casing of a trap having a laterally extending nozzle 2 provided with an inlet port 3; the end of said nozzle being threaded to engage a coupling nut 4 for the purpose of binding a nipple 5 on to the inlet nozzle 2. The base section 1 of the outer casing is also provided with a central extension 6 having an interior thread 7 to engage a discharge pipe. A valve opening 8 surrounded by a valve seat 9 is also formed in said base section. The upper section 10 of the casing of the trap is connected with the base section in any suitable manner, preferably by means of a threaded flange 11 which engages a corresponding thread formed interiorly on the base section 1 as illustrated in Fig. 2. The interior of the upper section of the trap is provided with a boss 12 that is hollowed out centrally and provided with a thread 13 to engage a corresponding thread formed on a stem 14 to hold said stem in position and permit the stem to be adjusted relatively to the boss 12 of the upper section of the casing of the trap.

The stem 14 supports a chambered expansible member which may be of any suitable construction having the capabilities hereinafter described, but preferably as illustrated in the drawings comprising two flexible corrugated plates 15 joined together at their outer margin 16. The inner central portion of the upper plate 15 is secured to the stem 14 in any suitable manner, preferably by means of a flange 17 formed on the stem 14 and by binding or otherwise securing the central inner portion of the upper plate 15 to said stem 14 and flange 17, by means of solder or otherwise, and if desired with the aid of an angular binding and reinforcing collar 18. A valve stud 19 is attached to or connected with the lower plate 15 of the expansible member centrally thereof, and may likewise be provided with a flange 20 to which the inner central portion of the lower plate 15 may be soldered or otherwise secured, and if desired with the aid of a reinforcing angular collar 21. The lower surface 22 of the stud 19 forms a valve adapted to bear on the valve seat 9 and close the valve opening 8.

The stem 14 on which the expansible member is mounted is preferably provided with an aperture 23 through which a volatile liquid may be inserted into the interior of the said member, and after said liquid has been inserted within said member the aperture 23 may be closed by a plug 24 and sealed in any suitable manner.

The interior of the expansible member is provided with a spring 25 the function of which is to normally press the flexible plates 15 apart, and is of sufficient strength, when not resisted by other agencies, to force the valve 22 down on or near to the valve seat 9 and close or restrict the valve port 8. The shape and location of said spring within the expansion member may be varied as desired.

An auxiliary member 26 is loosely mounted within the expansible member, and although shown herein in the form of a circular ring, its shape may be modified without departing from my invention. The auxiliary member 26 performs two independent functions. It absorbs or prevents any audible vibration of the thin flexible walls of the expansible member, and it also serves as a guard or stop to limit the inward compression or collapse of the walls of said member.

I prefer to use the auxiliary member or guard 26 within the expansible member as the most convenient place to locate it, although said member may be placed against the outside of one of the walls of the expansible member if its purpose is designed to simply prevent audible vibration of the walls of the expansible member. In the performance of its function to absorb any audible vibration of the thin flexible walls of the expansible member, the auxiliary member 26 is distinguished from prior devices used solely to prevent undue collapse of the expanding member, in that said auxiliary member is mounted upon one of the vibrating walls of the expansible member and moves in synchronism with the vibrating wall of the expansible member upon which it is mounted.

When in operation the trap is connected by means of the nipple 5 with the discharge end of a radiator and the threaded portion of the extension 6 is connected with the return pipe of a heating system preferably having a partial vacuum maintained therein. When there is water of condensation in the lower portion of the radiator the valve is in the position shown in Fig. 2 of the drawing removed from its seat for the water of condensation and air to pass out of the radiator into the return pipe. After the water of condensation and air have passed out of the radiator, steam flows into the casing of the trap and comes in contact with the walls of the expansible member. The increased heat of the steam applied to the expansible member causes the volatile liquids within said member to vaporize and expand said member, thereby forcing the valve down on to its seat so as to prevent the passage of steam from the radiator into the return pipe.

The valve remains closed on its seat as long as there is steam within the trap, but when water of condensation again accumulates within the radiator and passes into the trap, the lower temperature of said water as compared with that of the steam causes the vapors within the expansible member to condense and the walls of said member thereupon contract and raise the valve 22 from its seat so as to again permit the water of condensation to flow out of the radiator through the trap and into the return pipe.

In the devices heretofore used in which a valve of a trap is controlled by an expansible member having volatile liquids and a partial vacuum therein, the vacuum employed is designed simply to aid the flexible walls of the expansible member to retract. But in my invention I employ a partial vacuum within the expansible member sufficient to aid not only in causing the walls of said member to retract, but also sufficient to overcome the tension of the spring 25 within the expansible member.

If the expansible member of a steam trap of the character herein described becomes impaired to such an extent as to leak and lose its partial vacuum and the whole or part of the volatile liquids contained within said chamber, the spring 25 will automatically force the valve down on or near to its seat, thereby preventing steam from going through the trap and into the return pipe and destroying the vacuum in the return pipe, and also preventing the loss of steam itself. The radiator having the defective trap is thereby placed out of service and the steam from the supply pipe is permitted to enter the radiators on the floors above the one having the defective trap.

The tension of the spring 25 is so correlated to the pressure exerted upon the outside of the expansible member and to the partial vacuum within said member as to cause said spring to be normally compressed by said agencies when the trap is in use. The tension of the spring becomes effective for necessary use only in case the expansible member has become damaged to such an extent as to leak and to lose its partial vacuum and the whole or part of the volatile liquid within said member. In that event the spring operates to close the valve and keep it on its seat and thereby place the trap out of service. When the trap is in service the spring is to all necessary purposes functionless. When the spring is performing its intended function the trap is functionless and out of service.

While traps embodying my invention are designed primarily to be used in connection with a radiator and a return pipe, the trap may be attached to the upper portion of a radiator to serve as a valve to deliver air from the radiator independently of the return pipe.

What I claim as new and desire to secure by Letters Patent is:

1. In a radiator trap, the combination of a valve, a valve operating chambered expansible member provided with a partial vacuum and a volatile liquid, and a spring arranged within said member so correlated to the partial vacuum as to be normally compressed while said vacuum is effective and adapted to expand said member when the vacuum has been destroyed and said member becomes defective, and hold the valve down on its seat.

2. In a radiator trap, the combination of an outer casing, having an inlet port, an outlet port and a valve opening, a chambered expansible member provided with a volatile liquid and a partial vacuum, a spring within said expansible member normally compressed while the partial vacuum is effective and adapted to expand said member when the vacuum has become lost, and a valve connected with said expansible member.

3. In a radiator trap, the combination with a casing, of a chambered expansible member having vibratile walls, a valve connected with said member, and an auxiliary metallic member placed loosely upon one of said walls between the center and periphery thereof and free from contact with any rigid portion of said expansible member, for the purpose specified.

4. In a radiator trap, the combination with a casing, of a chambered expansible member comprising two flexible walls secured together at their outer margins, one of said walls being connected with said casing, a valve connected with the other wall, and a metallic ring placed loosely upon one of said walls between the center and periphery thereof and free from contact with any rigid portion of said expansible member, for the purpose specified.

CLAYTON AUBRA DUNHAM.

Witnesses:
R. U. Thompson,
O. S. Petterson.